United States Patent [19]
Takano et al.

[11] Patent Number: 4,506,142
[45] Date of Patent: * Mar. 19, 1985

[54] VOICE ACTUATED HEATING APPARATUS

[75] Inventors: Teruhisa Takano, Osaka; Shigeki Ueda, Nara, both of Japan

[73] Assignee: Matsushita Electric Industrial Co., Ltd., Kadoma, Japan

[*] Notice: The portion of the term of this patent subsequent to Jul. 20, 1999 has been disclaimed.

[21] Appl. No.: 389,490

[22] Filed: Jun. 17, 1982

Related U.S. Application Data

[63] Continuation of Ser. No. 217,651, Dec. 18, 1980, Pat. No. 4,340,797.

[30] Foreign Application Priority Data

Dec. 21, 1979 [JP] Japan .................................. 54-167404

[51] Int. Cl.³ ............................................. H05B 6/68
[52] U.S. Cl. .............................. 219/490; 219/10.55 B; 99/325
[58] Field of Search ............... 219/10.55 B, 10.55 R, 219/10.55 E, 10.55 M, 482, 490, 506; 381/42, 41, 43, 44, 45, 51, 52, 53, 110; 367/198; 364/513.5; 99/325

[56] References Cited
U.S. PATENT DOCUMENTS

| | | | |
|---|---|---|---|
| 3,286,031 | 11/1966 | Geddes | 367/198 |
| 4,144,582 | 3/1979 | Hyatt. | |
| 4,255,639 | 3/1981 | Kawabata et al. | 219/506 |
| 4,339,646 | 7/1982 | Doi et al. | 219/10.55 B |
| 4,379,640 | 4/1983 | Inoue | 381/51 X |

FOREIGN PATENT DOCUMENTS

| | | | |
|---|---|---|---|
| 2546195 | 4/1976 | Fed. Rep. of Germany. | |
| 2800387 | 7/1979 | Fed. Rep. of Germany. | |
| 55-126738 | 9/1980 | Japan | 219/10.55 B |

OTHER PUBLICATIONS

IBM Technical Disclosure Bulletin—vol. 20, No. 11B, Apr. 1978.

*Primary Examiner*—Philip H. Leung
*Attorney, Agent, or Firm*—Cushman, Darby & Cushman

[57] ABSTRACT

A heating apparatus, such as an electric oven or an electronic oven including a voice recognition part which recognizes voice command of the user and produces a recognition code by receiving the voice command and performs operation by the voice command. Heating sequences are preliminarily stored in a memory of a control part, and one of them are selected by a recognition code produced by the voice recognition code, and preset in the memory. Heating members are controlled in a manner to heat the heating object according to the preset heating sequence. Such selection and presetting of the heating sequence is performed only when at least two sequential voice commands are fed to the voice recognition part in a predetermined order.

3 Claims, 17 Drawing Figures

| Recognition code [HEX] | Standard instructions |
|---|---|
| 1 | START |
| 2 | STOP |
| 3 | YES |
| 4 | RESET |
| 5 | AUTŌ |
| 6 | VEGETABLE |
| 7 | BEEF |
| 8 | BACŌN |
| 9 | PŌTATŌES |
| A | BEANS |
| ⋮ | ⋮ |

Time →

FIG. 10 (b)

(V_{BPF})

Time →

Time →

VOICE ACTUATED HEATING APPARATUS

This is a continuation of application Ser. No. 217,651 filed Dec. 18, 1980, now U.S. Pat. No. 4,340,797.

RELATED APPLICATIONS

This application is directed to subject matter that is related to the subject matter of the following co-pending U.S. patent applications all filed Dec. 18, 1980; UEDA et al Ser. No. 217,685 U.S. Pat. No. 4,340,800; UEDA et al Ser. No. 217,684 U.S. Pat. No. 4,340,798; and UEDA et al Ser. No. 217,653 U.S. Pat. No. 4,340,798.

BACKGROUND OF THE INVENTION

1. Field of the Invention:

The present invention relates to a heating apparatus which can be controlled by voice command rather than by the pushing many switch buttons.

2. Prior Art:

In a heating apparatus, a heating sequence for an object to be heated must be defined before a start of a heating operation. For example, to defrost a frozen meat in an electronic oven, it is desirable to heat for 30 minutes using a low power of about 250 W as a first step, then stop heating about 30 minutes as a second step to allow time for the temperature of the meat become uniform. As a final third stage, the defrosted meat is heated with a high output power of about 700 W for 10 minutes. Such a complex heating sequence is, in conventional heating apparatus, preset by a keyboard entries, namely by pushing an output power selecting key and a time key alternately. Therefore keying operation becomes comparatively complex, and sometimes a user must input the heating sequence again when the entered date is in error, when the heating object is overheated when the user is not aware of a malfunction.

Generally speaking, when the user operates the heating apparatus to heat some foods, the user's hand is sometimes wet or oily etc. from food preparation. Since the user must touch the operating panel of the apparatus the panel may become oily or wet. This enhances the probability that a user may get an electrical shock.

One effort to overcome such disadvantages, provided an automatic electric oven the card reader type which reads a cooking card comprising a magnetic band preliminarily written with a heating sequence. However, the electric oven of such type sometimes missread the cooking card that has become stained or wet. Also if the user lost a cooking card it was not possible to use that heating sequence. Therefore, the card reader type apparatus was not satisfactory.

In recent years, attempts have been made to introduce recorded voice, letters or words, signs or picture as an aid or guide in communicating input commands into electronics systems in order to attain easier and more natural interaction between the user and the apparatus. Especially, the use of voice is attracting much attention as a most natural communication medium between man and machine, and the use of the voice in the apparatus becomes more and more practical as semiconductor technology develops to provide increasing speeds and increases of memory capacity through higher integrations in the device, and through appearance of microcomputers used as a controlling units, etc.

The present invention purposes to comply with the technology into a heating apparatus. Applicants recognize that the present state of the art of voice recognition does not always provide a perfectly accurate result even though the number of uses to be voice recognized is limited, and therefore, they provide not only an improvement in the voice recognition system hardware, but also provide an overall arrangement providing enhanced safe operation so as to prevent fatal accidents such as may result from overheating due to misrecognition by the voice recognition circuit. That is, since the heating apparatus includes an electric heater or a microwave heating system, when an erroneous operation of the apparatus without a load therein (object to be heated) is carried out, then an enclosure case or a door of the apparatus becomes heated to a high temperature, thereby causing a liability of burning on the user's hand or further a fire, or at least a damaging of the enclosure case or door or microwave oscillator, heater or other elements.

SUMMARY OF THE INVENTION

The present invention provides a heating apparatus, such as an electronic oven, an ordinary electric oven or a gas oven, capable of being controlled by in response to everyday language or words instead of by the touching of keys on the operating panel thereof in order to eliminate the abovementioned disadvantages. In the heating apparatus, some heating sequences are preliminarily set in the apparatus and the user can select one of them by a voice command. The heating apparatus operates only when voice commands are applied to the apparatus in a predetermined order, thereby preventing undesirable erroneous operation from ambient noise.

The heating apparatus in accordance with the present invention can perform as follows:

The heating apparatus has a plurality of preliminarily stored heating sequences corresponding to a kind of cooking or materials, and selects one of them by a voice command, thereby a complex switch operation to set the heating sequence can be eliminated.

When the apparatus recognizes user's voice commands, the apparatus displays the result of recognition so that user can conform the user's voice command.

The heating apparatus operates only when at least two sequential voice commands in a scheduled order are applied, thereby a mal-operation of the apparatus by ambient noise can be effectively reduced. As an added safety feature, certain instruction require the apparatus to demand confirmation such as, for example, a "start of heating" command after a "start of heating" command, the apparatus requests that the user made an additional voice command to confirm it, thereby the safety in the automatic operation is improved.

DESCRIPTION OF THE PREFERRED EMBODIMENT

A heating apparatus in accordance with the present invention comprises:

(a) an enclosure case having therein a heating chamber in which a heating object is to be placed, the enclosure case having a door at an opening of the heating chamber, and (b) a heating means for radiating a heating energy to be fed in the heating chamber, wherein the improvement is that the heating apparatus comprises:

(c) a voice command input means including a microphone which transforms user's voice command into a command input signal, (d) a pattern analyzer which analyzes the command input signal and subsequently samples it and carries out A/D conversion thereof to produce a pattern-analyzed input signal, (e) an input pattern memory which memorizes the pattern-analyzed input signal, (f) a reference pattern memory which stores time sequential pattern data of a predetermined number of pattern-analyzed reference signals, (g) a recognition circuit which compares the input signal pattern with the reference pattern and determines a pattern affinity, and produces at least a predetermined recognition code corresponding to a recognized command, when the affinity is more than a preset level, (h) a control part therein including a memory which preliminarily stores a plurality of heating sequences, the control part selects and pre-sets one of said heating sequences based on the recognition code and controls the heating means in a manner to heat the heating object according to the preset heating sequence, and (i) a display means which displays the selected heating sequence.

The present invention is explained hereafter referring to the attached drawings.

Figure 1:
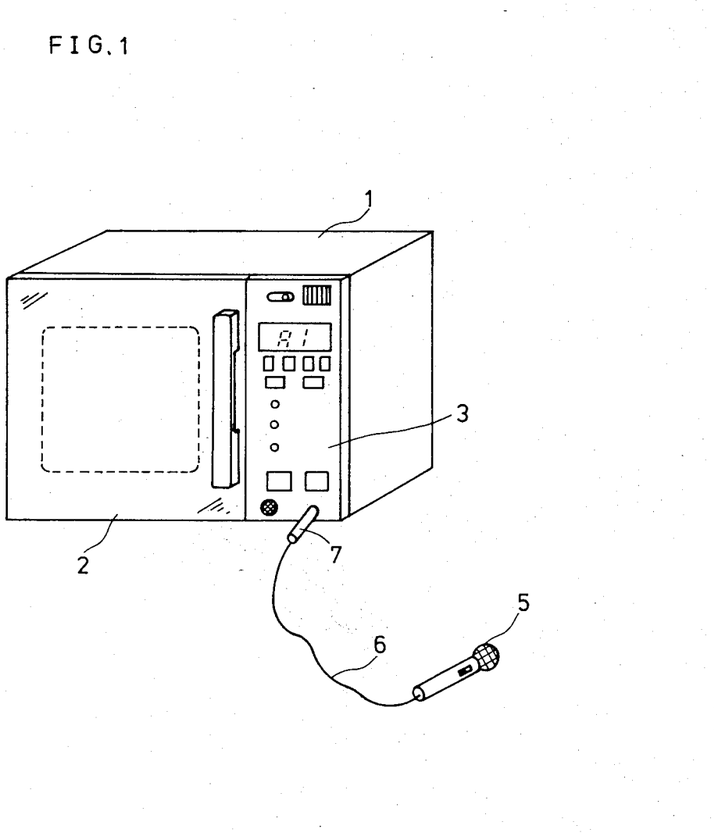
FIG. 1 is a perspective view of a heating apparatus embodying the present invention.
Figure 2:
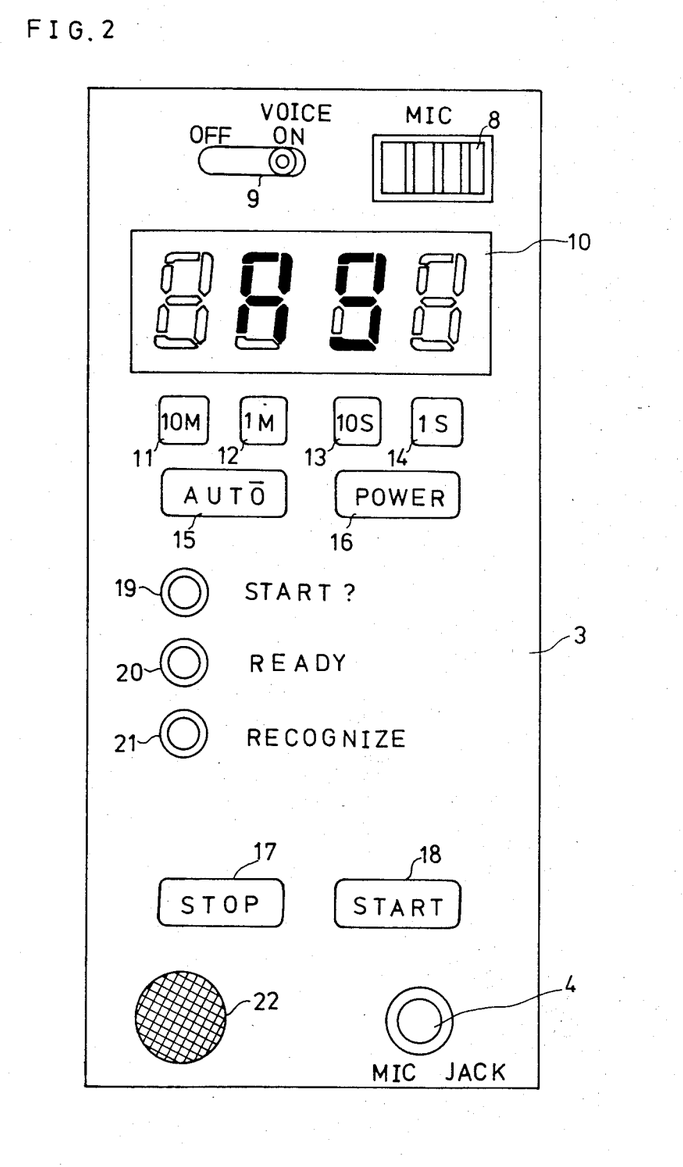
FIG. 2 is an elevation view of a front panel of the heating apparatus of FIG. 1.

FIG. 1 shows a perspective view of an embodiment of a heating apparatus in accordance with the present invention, wherein the numeral 1 designates an enclosure case, 2 designates a door which shuts an opening of a heating chamber, and 3 designates a front panel illustrated in FIG. 2 in more detail. As shown in FIG. 2, the front panel 3 has a connecting socket 4, which connects a microphone 5 through a cable 6 and a connector 7 as shown in FIG. 1 for applying a voice command to a voice recognition part, another microphone 8 built in the enclosure case 1 for applying voice command to the voice recognition part, a switch 9 for changing whether the voice recognition part operates or not, and a display which may comprise fluorescent indication tubes 10 of four figures which can indicate numerals and some letters of alphabet. On the front panel 3, there are push buttons of a manual input part, namely, time setting keys 11, 12, 13 and 14 which set heating period to be indicated by figures of the fluorescent indication tubes 10, a switch 15 which selects belowmentioned heating sequence, a switch 16 which selects strength of the output power, a stop key 17 which stops heating or makes a selected heating sequence clear, and a start key 18 which starts the action of heating. Furthermore, there are indication lamps 19, 20 and 21, and a buzzer 22 on the front panel 3. The indication lamp 19 indicates an inquiry to user as to whether the heating apparatus should start to heat or not, the indication lamp 20 indicates that the apparatus is prepared to receive a voice command, and the indication lamp 21 indicates that the received voice command has been recognized. The buzzer 22 indicates the recognition of the voice commands, the termination of heating etc.

Figure 3:
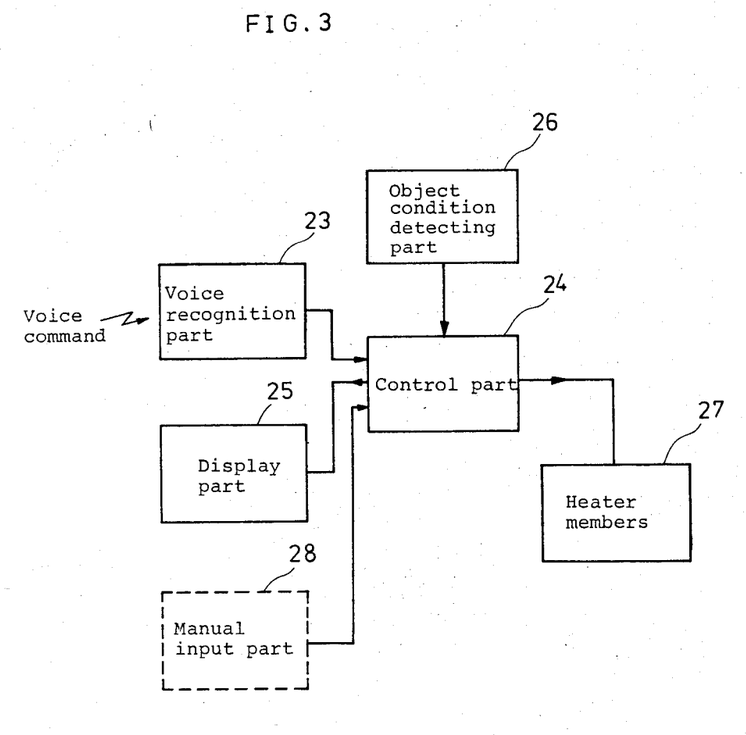
FIG. 3 is a circuit diagram of an example of the present invention.
Figure 4:
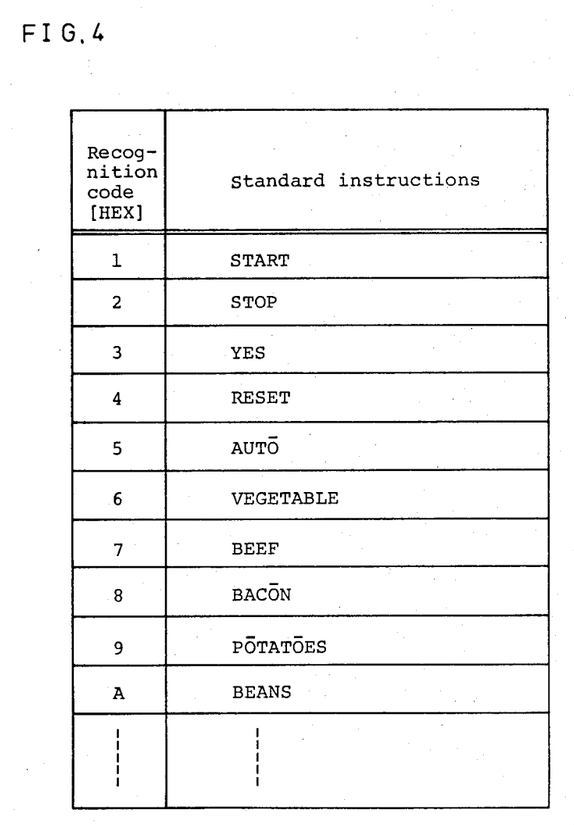
FIG. 4 is a list of standard instructions of voice commands and the recognition codes thereof.
Figure 5:
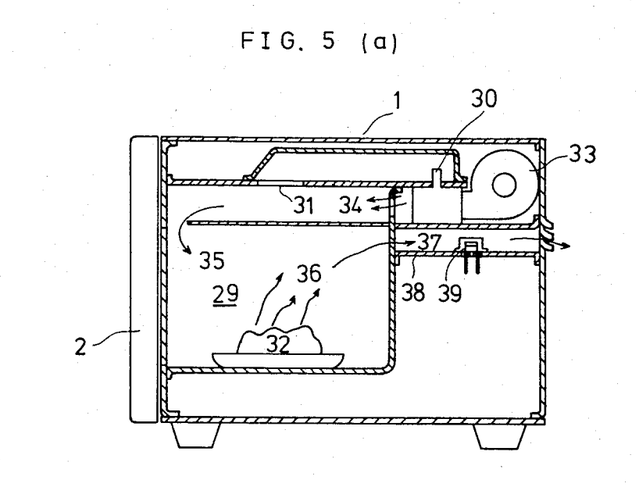
FIG. 5(a) is a central sectional view of one example of the heating apparatus of the present invention.
FIG. 5(b) is a graph of humidity change with respect to the heating time.

FIG. 3 shows a block diagram of the preferred embodiment in accordance with the present invention. Voice commands of users are applied to a voice recognition part 23. The voice recognition part 23 stores finite recognizable standard instructions in a below-mentioned manner and compares the voice command with the stored standard instructions in a below-mentioned manner. The applied voice command is recognized by the voice recognition part 23 and one of a plurality of recognition codes as shown in FIG. 4 is fed to a control part 24. For example, in case a voice command "AUTO" is applied, the voice recognition part 23 generates a recognition code "5" and send it to the control part 24. FIG. 4 shows a list of an example of standard instructions for controlling the heating apparatus in command voice, whose words are used in every day. The standard instructions shown in FIG. 4 are only one example of predetermined codes list, and the words to be pre-registered as standard instructions are not limited to these words. The recognition code "5", namely the instruction "AUTO", means an automatic heating operation which automatically controls heating of a heating object and stops after heating for a predetermined time by inputting a name of cooking or material such as "BEEF" as described lower than the recognition code "5" in FIG. 4. Such automatic heating is embodied by the control part 24 and an object condition detecting part 26. The object condition detecting part 26 detects a heating condition of a heating object 32 by measuring a temperature of the heating object 32 by using a detecting device inserted into the heating object 32 or by simply measuring a temperature of a heating chamber 29. The heating condition can be detected by using humidity change of the heating chamber 29 where the heating object 32 generates moisture as described in FIG. 5. The control part 24 preliminarily stores a plurality of heating sequences with regard to the kind of cooking or materials so as to carry out automatic heating operation without setting heating time. With this structure, various kinds of heating operations can be automated using only a few words for recognition.

After one heating sequence is selected from the plurality of heating sequences available the selection being made by a voice command, the selected heating sequence is indicated by display part 25. Then the control part 24 controls heater members 27 such as a magnetron, a fan etc. in a manner to execute the selected heating sequence when a voice command for starting heating is given to the apparatus.

FIG. 5(a) shows one example of the heating apparatus of the present invention using a humidity sensor disposed at a part of the heating chamber 29 wherein the heating object 32 is disposed as the object condition detecting part 26. A magnetron 30 generates microwave energy and radiates it into the heating chamber 39 through an opening 31 of a waveguide. Wind generated by the fan 33 flows by the magnetron 30 to cool it down and is conducted into the heating chamber 29 as shown by arrows 34 and 35 in FIG. 5(a). As the heating object 32 is heated, moisture contained in the heating object 32 evaporates, and is exhausted from the heating chamber 29 to an exhaust guide 38 as shown by arrows 36 and 37. A humidity sensor 39 is disposed in the exhaust guide 38, to detect the humidity of the exhausted air. FIG. 5(b) shows a humidity change with respect to the heating time t.

In FIG. 5(b), at the time $t=t_0$, the heating of the heating object 32 starts. At the initial stage of the heating, the humidity slightly decreases by the rise of the temperature, as a result of evaporation of water in the heating object 32. By defining that a time length $T_1$ is from the time $t_0$ of a start of heating till the time $t_1$ when the humidity increase $\Delta H$ exceeds a predetermined value, then a period $T_2$ from the time $t_1$ to the time $t_2$ of the end of heating can be determined as a function of $T_1$, for example an equation $T_2 = K \times T_1$ (K: const.). And by preliminarily preparing various values of K corresponding of kinds of cooking or materials are preliminarily set the heating apparatus can automatically cook various kinds of heating object 32. By selecting the values K, the user can safely cook by a simple selection of cooking kind, without necessity of setting time period of heating for each heating object.

The principle of voice recognition is made such that the voice command is analyzed to a time sequential pattern data and compared with a preliminarily stored pattern analyzed data of the standard instructions, and then a search is made to find a standard instruction whose analyzed data is substantially identical to that of the voice command.

The circuit structure of an example of the apparatus in accordance with the present invention is elucidated hereinafter referring to the drawings of FIGS. 6, 7, 8, 9, 10(a), 10(b), 10(c), 11 and 12.

Figure 6:
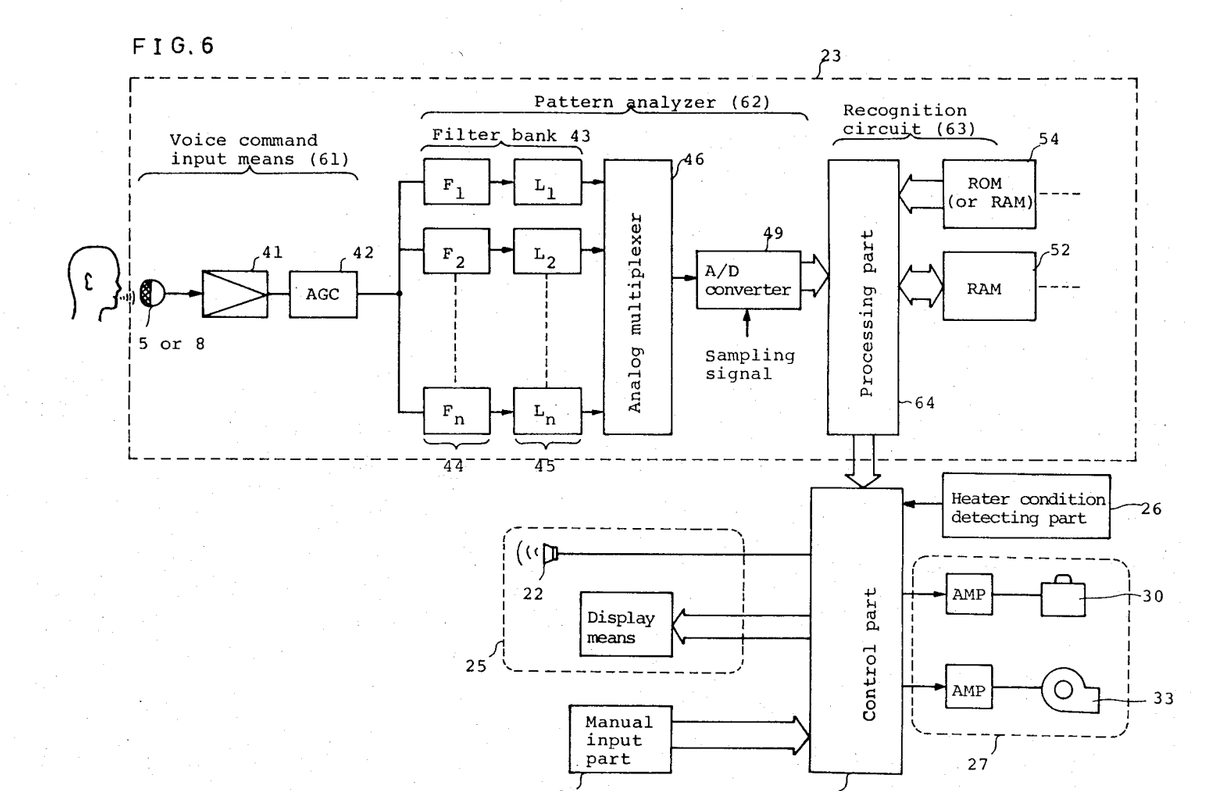
FIG. 6 is a circuit block diagram of the embodiment.
Figure 7:
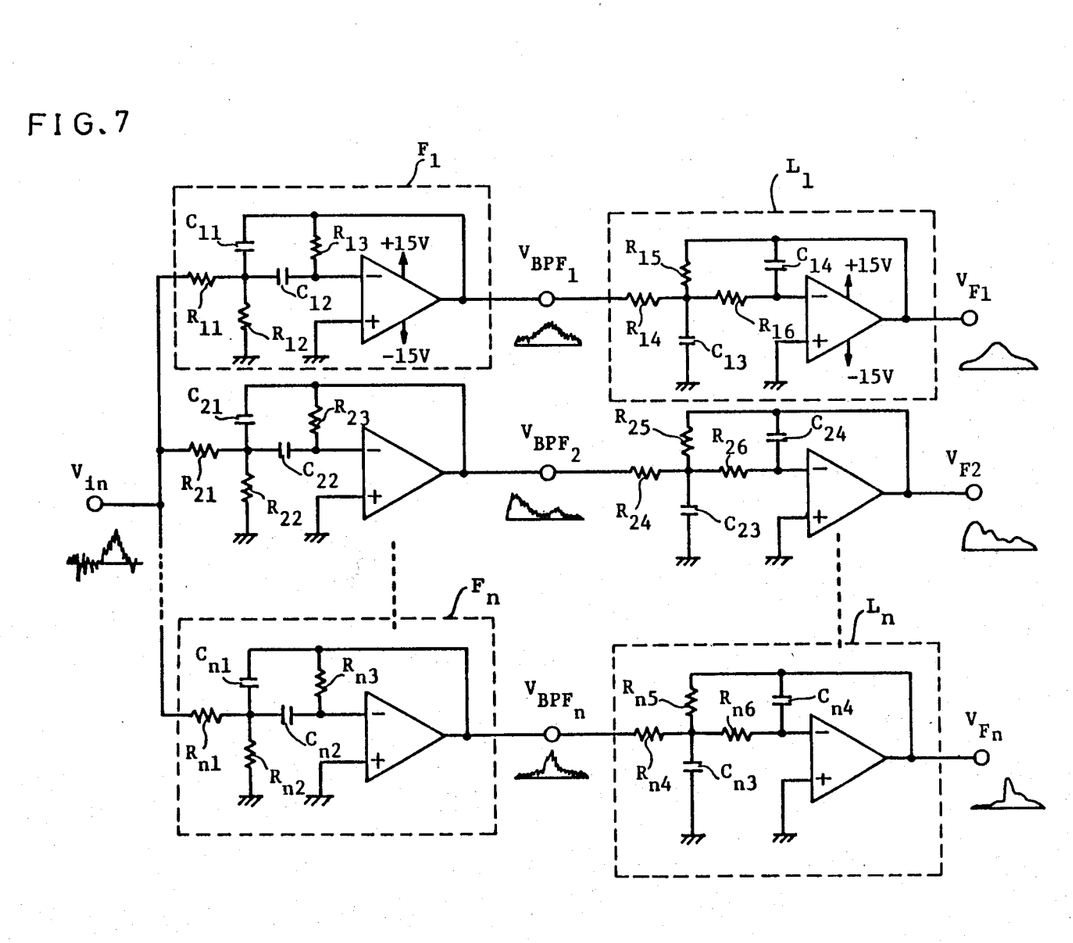
FIG. 7 is a circuit diagram of an example of a filter bank of the embodiment.
Figure 8:
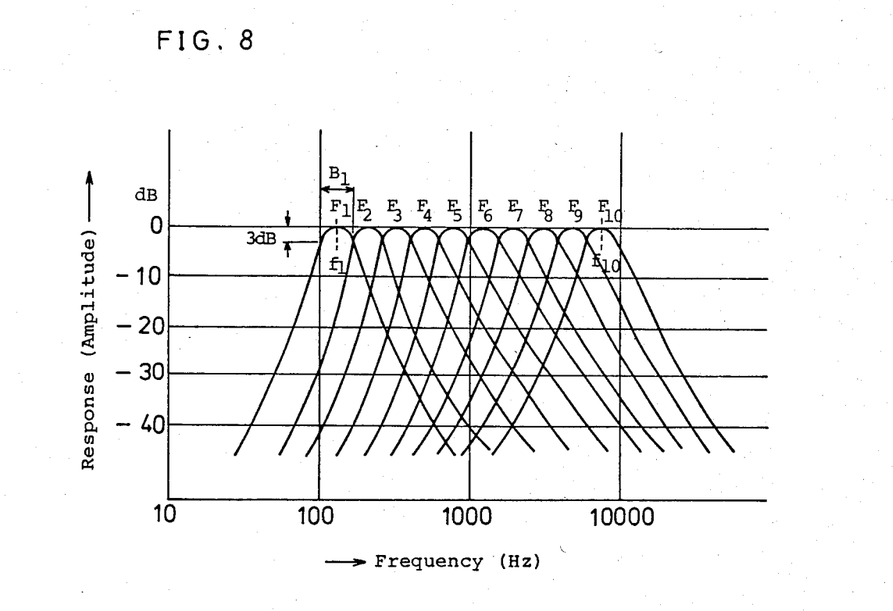
FIG. 8 is a frequency characteristic graph of bandpass filters of the filter bank of FIG. 7.

In FIG. 6, the microphone 5 or 8 receives the user's voice command and converts the voice command to a voice electric signal, which is amplified by an amplifier 41 with an automatic gain control circuit 42. The voice electric signal is then led to a filter bank 43 comprising a plurality of band-pass filters 44 and low-pass filters 45. FIG. 7 shows an example of an actual circuit structure of such filter bank 43, which comprises multiple feed-back type band-pass filters $F_1, F_2, \ldots, F_n$ and multiple feed-back type low-pass filters $L_1, L_2, \ldots, L_n$. The band-pass filters $F_1$ to $F_n$ have frequency characteristics shown in FIG. 8, wherein a frequency range of 100 Hz to 10 KHz is covered by ten band-pass filters $F_1$ to $F_{10}$, wherein the center frequencies $f_j$ and the band width $B_j$ ($j=1, 2, \ldots, 10$) are designed as shown in FIG. 8.

Figure 9:
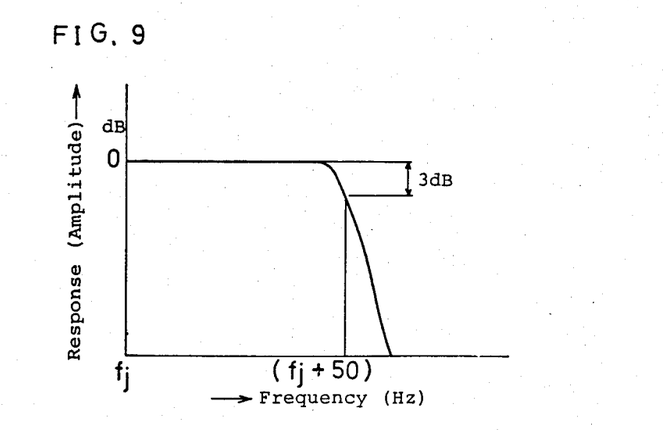
FIG. 9 is a frequency characteristic graph of a low pass filter of the filter bank of FIG. 7.
Figure 10:
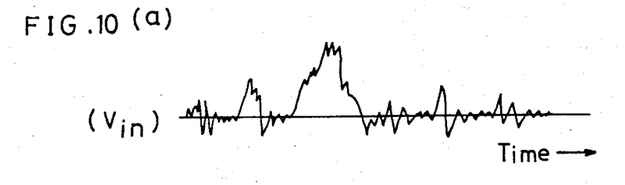
FIGS. 10(a), 10(b) and 10(c) are frequency characteristic graphs of various part of the filter bank.
Figure 11:
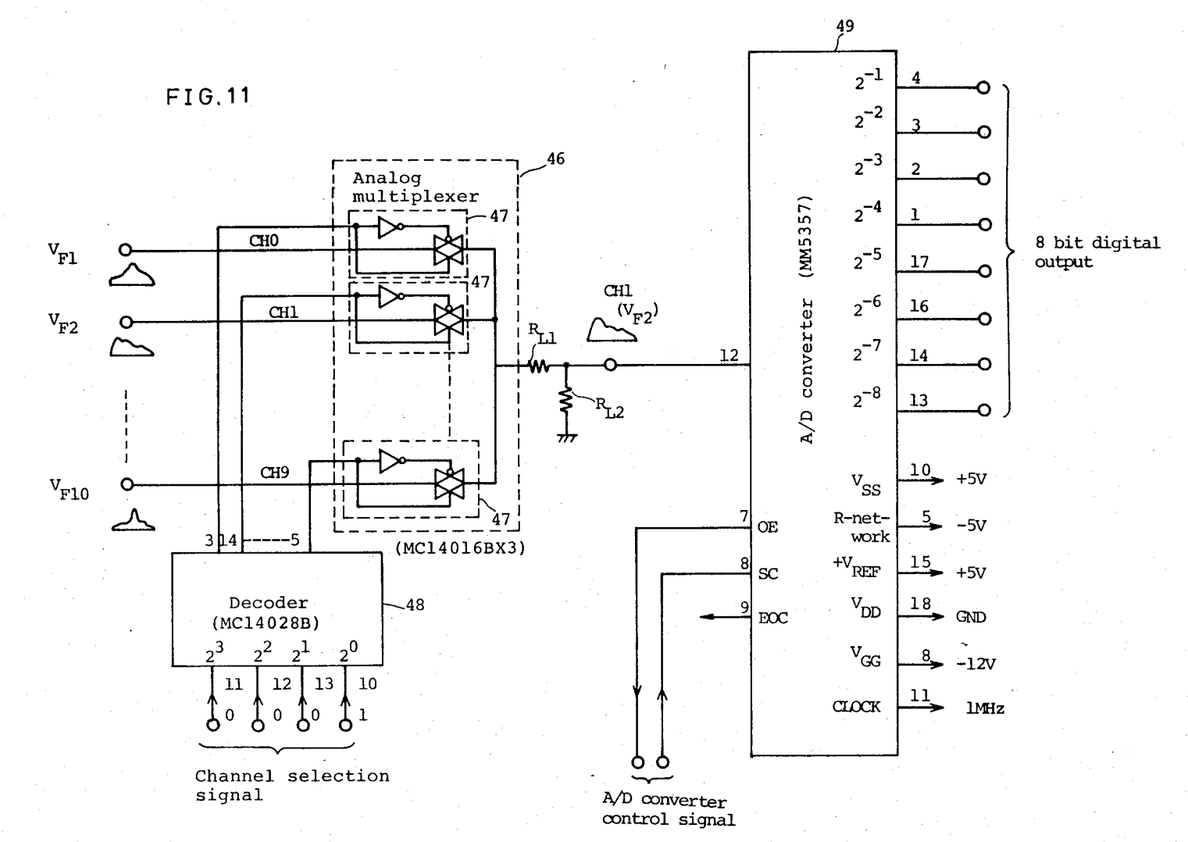
FIG. 11 is a circuit diagram of an analog multiplexer and an A/D converter.

The low-pass filters 45 have the cut-off frequencies as shown in FIG. 9. In the example, the low-pass filters 45 are of multiple feed-back type having the cut-off frequencies of 50 Hz. By using such filter bank 43, the command voice $V_{in}$ is analyzed into data in ten frequency bands. FIG. 10(a) shows the voice waveform $V_{in}$ and FIG. 10(b) shows waveform of the output signal $V_{BPF}$ of a band-pass filter. As shown in FIG. 10(b), the waveform of the signal $V_{BPF}$ contains pitch of the voice, and therefore, the signal $V_{BPF}$ is passed through the low-pass filter to remove the pitch and obtain a filter bank output $V_F$ of smoothed envelope waveform as shown by FIG. 10(c). The larger the number of the filters, the better the analysis of the voice pattern can be made. However, the use of too many filters makes the cost and bulk of the apparatus too large, and therefore, a reasonable number for a home use utensil should be selected in considering a suitable recognition ability and speed of controlling part from both aspects of software and hardware. For the case wherein a below-mentioned 8-bit microprocessor is used for its control part, 10 filters each for the band-pass filters and low-pass filters are empirically found suitable or effective. The output signal of the filter bank 43 is then led into the analog multiplexer 46, and the outputs of the low-pass filters $L_1, L_2, L_3, \ldots, L_{10}$ are in turn sent to the multiplexer 46 and the output of the multiplexer 46 is subject to sampling by an A/D converter 49. The analog multiplexer 46 is, as shown in FIG. 11, comprises ten analog switch 47, which are consists of, for example, three C-MOS devices of MC14016B (a four circuits analog switch) produced by Motorola Inc. Channel switching is operated by channel selection signal sent from the CPU in the control part. A decoder 48 decodes the 4-bits binary type channel selection signal into 10-bits signal to be given to the multiplexer 46. The decoder 48 is structured by using a BCD to Decimal Decoder of MC14028B produced by Motorola Inc. For example, when a "0001" signal is input, the decoder 48 outputs channel 1. Accordingly, the signal $V_{F2}$ is sent to the output terminal of the analog multiplexer 46. By switching the channel selection signal in the similar manner, outputs of ten filters of the filter bank 43 are issued in turn at the output terminal of the multiplexer 46.

Then, the output signals of the filter bank 43 are sent to the A/D converter 49 and converted into 8-bits digital signals. The A/D converter 49 is consists of, for example, a monolithic A/D converter MM 5357 of NS Inc. By adjusting the load resistors $R_{L1}$ and $R_{L2}$, the analog input signal is adjusted to be within $\pm 5$ V. The input terminal SC of the A/D converter 49 receives a start conversion signal, by which output signal of the analog multiplexer 46 is sampled with a period of between 1 and 10 m sec. With such period, enough pattern characteristic recognition can be made when the voice waveform is handled as envelope signals. The output terminal EOC outputs an end-of-conversion signal, and the output terminal OE outputs an outputenable signal having effective timing of the 8-bits digital output signal. The CPU 50 in turn samples the filter bank outputs by means of the SC signal, sweepingly outputting the channel selection signal, and converts into 8-bits digital data, and the abovementioned processing is made by using the OE signal as monitor.

Figure 12:
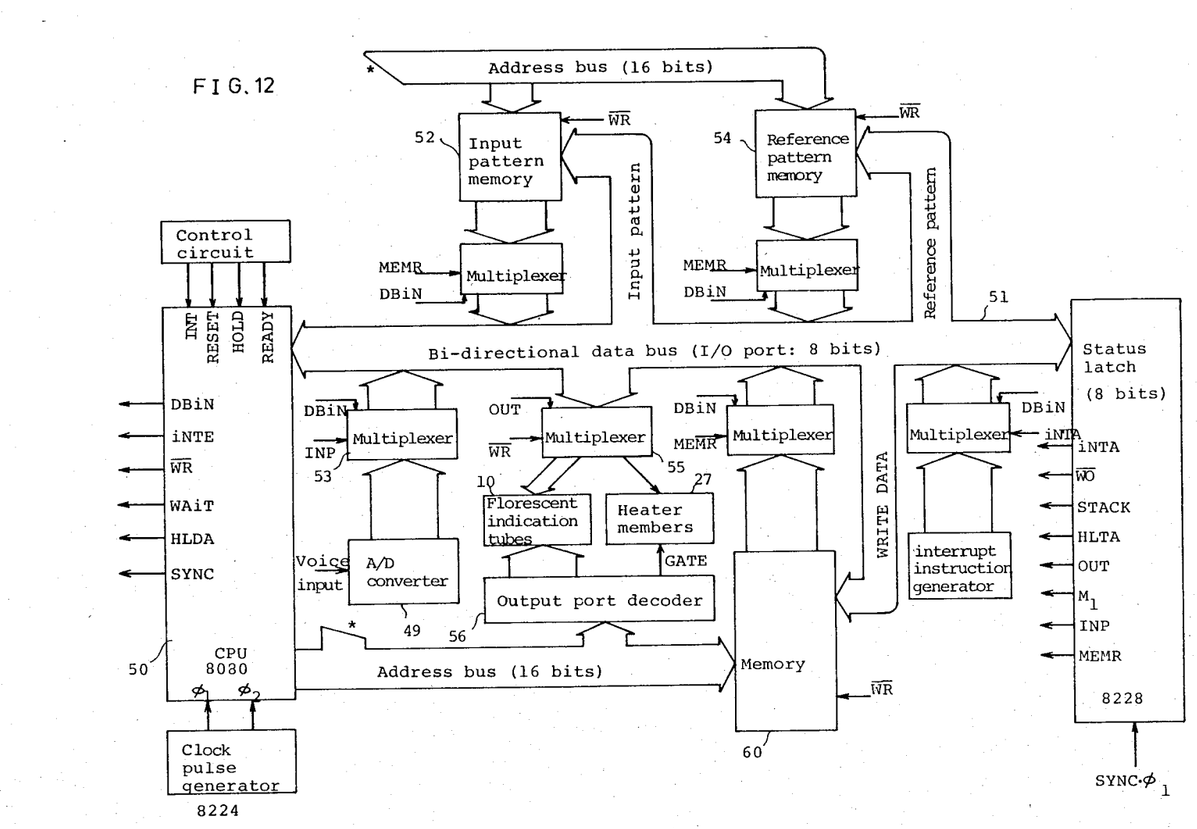
FIG. 12 is a detailed circuit block diagram of a recognition circuit 63 and a control circuit 24 of the block diagram of FIG. 6.

FIG. 12 shows a block diagram of one example of such CPU system 50, constituted by using an 8-bits microprocessor, Intel 8080. The voice data (8-bits digital signal) is written into an input pattern memory 52 through the bi-directional data bus 51 (shown in FIG. 6). That is, the 8-bits voice data issued from the A/D converter 49 is sent to the bi-directional data bus 51 in a data reading mode under the control of the multiplexer 53. The voice data is once written into the input pattern memory 52 by a control signal from the CPU 50. By means of such process, the voice data in the input memory 52 are analyzed in every frequency band, and then is sampled by the A/D converter 49.

Then by detecting of the end of the voice input signal, the CPU 50 counts the time length T (FIG. 10(c)) of this voice input pattern, and normalizes this time length by utilizing known dynamic programming (DP), in which DP process, the input voice pattern is compared to the reference pattern registered in the reference pattern memory 54, and partial expansion or partial compression is carried out until the voice input pattern most closely coincides with the reference pattern, so that a reference pattern with highest affinity with the input pattern is selected.

For more information on the DP technique applied for the voice recognition, reference is made to, for example IEEE Transactions on Acoustics, Speech, and Signal processing, Vol. ASSP-26, No. 1, pp. 43–49, February 1978, and Vol. ASSP-27, No. 6, pp. 588–595, December 1980.

By means of the abovementioned recognition process, the voice input signal is decided as being coincided with the selected reference pattern, and therefore, a specified output signal is provided to a multiplexer 55 for controlling output means. Thereby, as shown in FIG. 13, a heating starting signal ON, an indication data for the fluorescent indication tube, the aforementioned channel selection signal or sampling signal SC are issued with the same predetermined timings that decides timings of an output port decoder 56.

Figure 13:
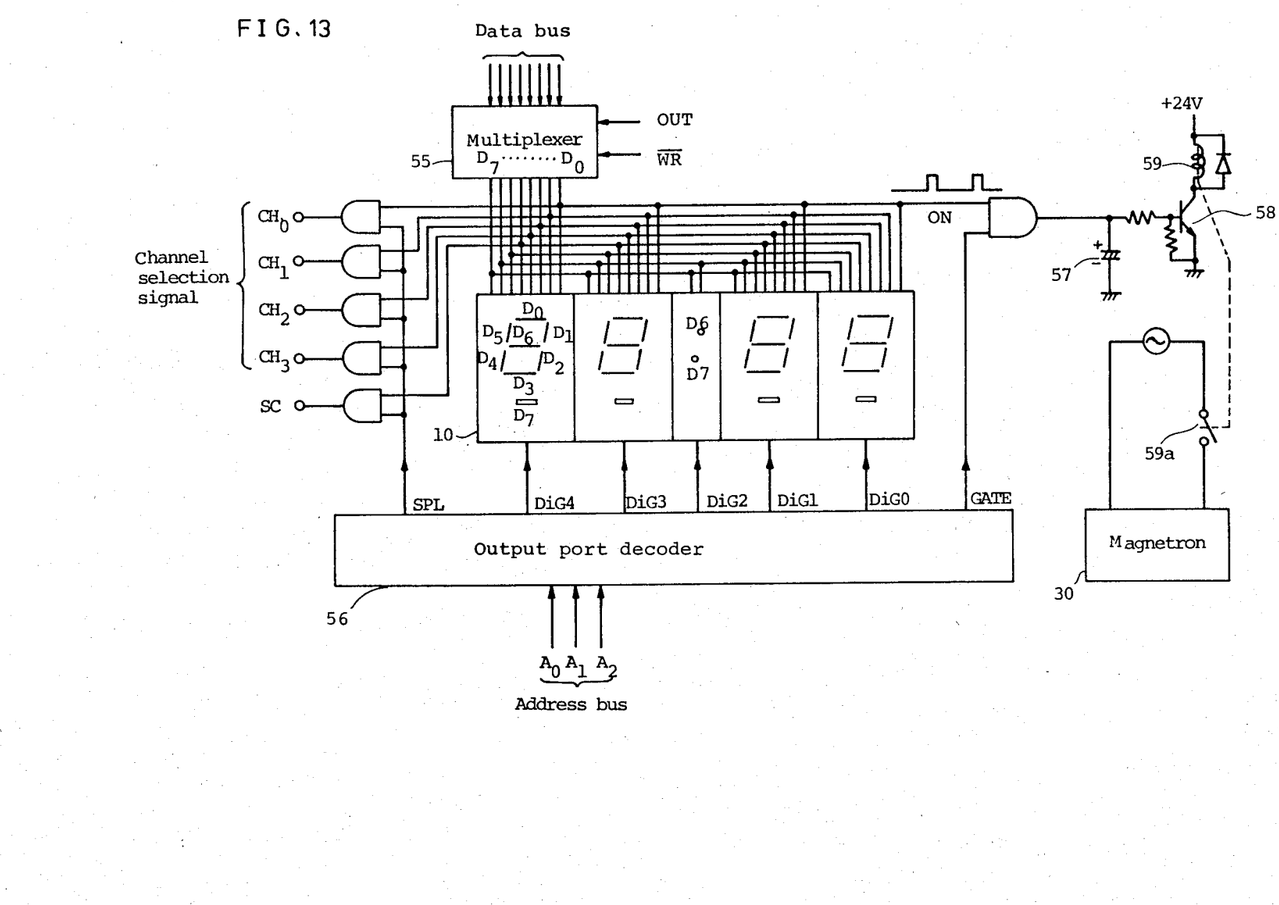
FIG. 13 is a circuit of an output block part of the present invention.

FIG. 13 is a block diagram of an output control circuit. The output port decoder 56 causes the output signal from the bidirectional data bus 51 through a multiplexer 55 to be selected to be given to the channel selection signal, the fluorescent indication tubes 10, or the heater members 27, respectively.

The heating starting signal ON is generated as a pulse, but is smoothed by a capacitor 57, and then turns a transistor 58 on and energizes a relay 59. By the energization of the relay 59, the contact 59a of the relay 59 closes and electric energy is fed to the magnetron 30. Upon a termination of the heating time or by manual pushing of the stop key 17, the signal ON changes to "L" level, and the contact 59a of the relay 59 opens and stops feeding the electric energy to the magnetron 30. The fluorescent indication tube 10 is dynamic-driven by the signals $DiG_4$ to $DiG_0$. The signals $CH_3$ to $CH_0$ are channel selecting signals and control the decoder 48 as mentioned above. The signal SC is a sampling pulse of the A/D converter 49.

Figure 14:
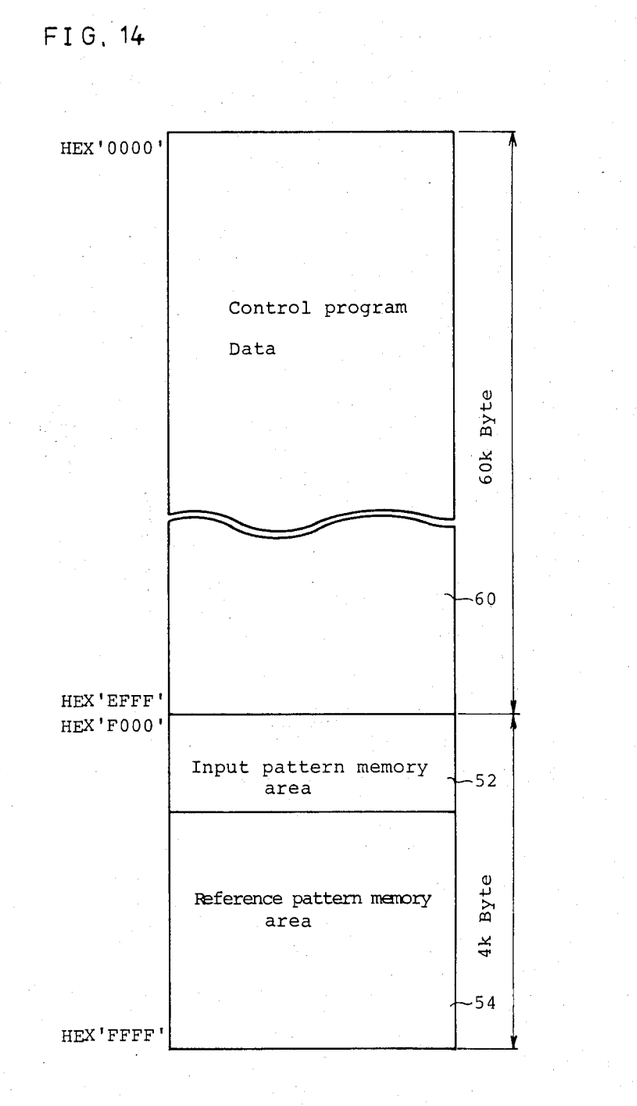
FIG. 14 is a memory map of memories of the embodiment.

The structure of the memory is explained below referring to a memory area map of FIG. 14. A program memory 60 in FIG. 12 stores control program and data for the CPU 50 in allotted addresses of HEX(hexadecimal)"0000" to HEX"EFFF". Necessary memory devices are actually provided within the address. A read and write memory such as a core memory or an IC memory is used for the memory 60. In case a ROM (read only memory) is used for control program per se and a RAM(randam access memory) for data, the memory system becomes compact and cheap. As shown in FIG. 14, addresses of HEX"F000" to HEX"FFFF" are allotted for the input pattern memory 52 and the reference pattern memory 54. The input pattern memory 52 can be embodied by using a read and write memory, a RAM, while the reference pattern memory 54 can be embodied by use of a RAM in case voice command data of one or several limited users are preliminarily stored in the RAM 54 in order to easily obtain recognition of the user's voice with the stored reference pattern. However, in order to recognize a voice command of an unlimited user, a standard reference voice pattern has to be stored in the reference pattern memory 54 consisting of a ROM.

By the abovementioned structure and process, the voice command "AUTO" is recognized. The recognition code is predetermined corresponding to the voice command as shown in FIG. 4. In this case, since the voice command is "AUTO", the recognition circuit 63 generates the recognition code "5" after the recognition operation and sends the code to the control part 24. The recognition circuit 63 sends a READY signal which indicates a ready state for sound receiving is accomplished, and a REJECT signal which indicates a failure of the recognition.

In FIG. 6, the control part 24 and the recognition circuit 63 are structured by one CPU. However, the recognition circuit 63 and the control part 24 can be structured by two CPUs.

In the meantime, the control circuit 24 receives the recognition code "5" indicating the voice command "AUTO", and accordingly the display part 25 indicates the result of the recognition. The indication is performed, for example, by a short beep of the buzzer 22 and a lighting of the indication lamp 21. And in order to indicate the voice command "AUTO", the letter "A" is lit at the second position of the fluorescent indication tube 10 as shown in FIG. 2. Furthermore, the indication lamp 20 is lit so as to indicate that now an input of a cooking name (for example the voice command "BEEF" etc.) can be received and is required.

The input using the voice commands is convenient for users since a manual operation is unnecessary. On the contrary, users may be apprehensive as to whether the heating apparatus recognizes the voice commands correctly or not. Therefore, in the present invention, the abovementioned simple display means indicate the recognition result to the users.

Furthermore, it will be difficult to distinguish the voice command of the user from an ambient noise, and mal-operation may occur by other people's unconscious pronunciation against the will of the user. Therefore, in order to improve such disadvantages, the heating apparatus of the present invention are structured in a manner to ignore the instructions unless two or more words are not applied in the predetermined order. Namely, the microprocessor of the control part 24 is programmed such that a voice command to follow the word "AUTO" must be a cooking name. For example, the voice command must be "AUTO" followed by "BEEF" or "AUTO" followed by "BACON".

In this example, after the recognition of the voice command "AUTO", a voice command of cooking name must be instructed. Even if a voice command "START" is recognized, such voice command is ignored since it is not within the sequence of the program. Besides, unless an appropriate voice command of cooking name is applied in a predetermined period after the voice command "AUTO", the recognized voice command "AUTO" is automatically cancelled in order to avoid mal-operation based on noise etc.

It rarely occurs that two or more erroneous commands are recognized successively by noise, accordingly mal-operation of the heating apparatus can be avoided. Furthermore, since the control part 24 and the recognition circuit 63 are structured by one CPU as the abovementioned embodiment after the recognition of the voice command "AUTO", the apparatus can be structured in a manner to receive only a voice command of cooking name or "RESET". Therefore, the recognition circuit 63 do without comparing the applied voice command with voice commands except these allowable voice commands, and recognition speed can be improved.

Returning to the abovementioned arguments, a voice command "POTATOES" is provided to the heating apparatus following to the voice command "AUTO", the control part 24 controls the display part 25 so as to light on the indication lamps 20 and 21 (these indication lamps turn off when the second voice command is applied) and to indicate user the completion of recognition. At that time, the voice commands are regarded as being correct, and therefore the program is set such that a heating sequence corresponding to this cooking is selected from the preliminary stored heating sequences and is preset to the memory 60. In order to indicate the selected heating sequence, a number "9", which corresponds to the heating sequence of potato as shown in FIG. 4, is lit at the third position of the fluorescent indication tube 10 as shown in FIG. 2.

By the abovementioned operation, the preparation of heating is accomplished. Then, the user says "START" to the microphone 5 or 8, the voice command is received by the voice command input means 61, and the voice pattern is analyzed by the pattern analyzer 62 and stored in the input pattern memory 52. And the voice command is finally converted to the recognition code "1" in the recognition circuit 63. The recognition code "1" is applied to the control part 24 and causing a starting of a preparation for feeding electric power to the magnetron 30. At that time, the indication lamp 21 is lit for indicating the recognition of the voice command "START". And simultaneously the indication lamp 19 of "START?" is lit for asking the user whether the heating operation should be actually started or not. If the voice command "YES" is not fed to the heating apparatus in a predetermined time, the recognized voice command "START" per se is reset. The heating operation does not start until the voice command "YES" is recognized and the recognition code is fed to the control part 24. Namely an ON signal is applied to the transistor 58 as shown in FIG. 13, thereby the magnetron 30 starts heating. In case the user wishes to stop the heating operation, she instructs "STOP" to the heating apparatus with the voice command, so that ON signal is changed to "OFF" and stops heating by deenergizing the relay 59.

The heating apparatus of the present invention can be structured in a manner that manual input from the manual input part 28 can be received by the apparatus even when the apparatus is in the voice recognition mode. At that time, it may possible to modify a part of a heating sequence, or to select a user's original heating sequence preliminary stored in a RAM by a voice command after the voice command of "AUTO".

While the invention has been described in connection with what is presently considered to be the most practical and preferred embodiments, it is to be understood that the invention is not to be limited to the disclosed embodiments but on the contrary, is intended to cover various modifications and equivalent arrangements included with the spirit and scope of the appended claims which scope is to be accorded the broadest interpretation so as to encompass all such modifications and equivalent structures.

What is claimed is:

1. In a voice-command heating apparatus including a heating element, a voice command circuit for detecting a user's voice command, a control circuit for controlling the heating apparatus in response to a detected voice command, and a control panel provided with at least a start key adapted to be operated by a user, the improvement comprising:

means for storing data corresponding to a plurality of heating level and corresponding heating time values, and a plurality of preprogrammed cooking sequences, each sequence for automatically controlling cooking in response to a measured parameter indicative of the progress of the cooking sequence; and wherein the voice command circuit identifies a first voice command and selects one of said cooking sequences, previously stored, to be executed, the voice command circuit including means for enabling an interactive communication between the apparatus and the user and requiring a communication from the user confirming a second voice command previously given for starting a cooking sequence.

2. An improvement according to claim 1, wherein the interactive communication means comprises at least one visual display.

3. An improvement according to claim 1 or 2, wherein the interactive communication means comprises a voice synthesizer and a speaker.

* * * * *